United States Patent
Ito

(10) Patent No.: US 8,018,138 B2
(45) Date of Patent: Sep. 13, 2011

(54) LIQUID LIGHT-EMITTING ELEMENT, LIGHT-EMITTING DEVICE, METHOD FOR MAKING LIGHT-EMITTING DEVICE, AND LIGHT-EMITTING BODY

(75) Inventor: Nobuyuki Ito, Kashiwa (JP)

(73) Assignee: Dai Nippon Printing Co., Ltd., Shinjuku-ku (JP)

( * ) Notice: Subject to any disclaimer, the term of this patent is extended or adjusted under 35 U.S.C. 154(b) by 261 days.

(21) Appl. No.: 12/259,365

(22) Filed: Oct. 28, 2008

(65) Prior Publication Data

US 2009/0121609 A1    May 14, 2009

(30) Foreign Application Priority Data

Oct. 29, 2007 (JP) ................ 2007-280664
Feb. 18, 2008 (JP) ................ 2008-036492
Apr. 22, 2008 (JP) ................ 2008-111450

(51) Int. Cl.
*H01L 51/50* (2006.01)
*H01L 51/52* (2006.01)
*H05B 33/00* (2006.01)

(52) U.S. Cl. ........ 313/503; 313/504; 313/502; 428/917

(58) Field of Classification Search .......... 313/500–512; 428/690, 917
See application file for complete search history.

(56) References Cited

U.S. PATENT DOCUMENTS

| 5,677,546 | A  | * | 10/1997 | Yu .................................. 257/40 |
| 5,895,717 | A  | * | 4/1999  | Cao et al. ................... 428/411.1 |
| 2004/0106005 | A1 | * | 6/2004  | Hamada et al. ............... 428/690 |
| 2007/0040499 | A1 | * | 2/2007  | Mizuno ........................ 313/509 |

FOREIGN PATENT DOCUMENTS

| JP | 2005071616 A | * | 3/2005 |
| JP | 2005-302332 |   | 10/2005 |
| JP | 2006-301302 |   | 11/2006 |
| JP | 2007-139899 |   | 6/2007 |

OTHER PUBLICATIONS

Yukitami Mizuno et al., "Liquid Light-Emitting Display". Toshiba Review, vol. 60, No. 9 (2005). p. 33-37.
S. Okamoto et al., "Increase in Electrochemiluminescence Intensities by Use of Nanoporous $TiO_2$ Electrodes". Journal of the Electrochemical Society. vol. 152(8), (2005) p. A1677-A1681.

* cited by examiner

*Primary Examiner* — Mariceli Santiago
(74) *Attorney, Agent, or Firm* — Burr & Brown

(57) ABSTRACT

A light-emitting device comprising a pair of baseplates respectively having surfaces facing each other, each surface having an electrode formed thereon, and a light-emitting layer sandwiched between the two baseplates. The light-emitting layer contains an ionic liquid and a light-emitting material dissolved in the ionic liquid. Since the light-emitting device is made without using any organic solvent, it is highly safe, does not deteriorate in emission characteristics, and requires a decreased number of constituent materials.

10 Claims, 7 Drawing Sheets (a)
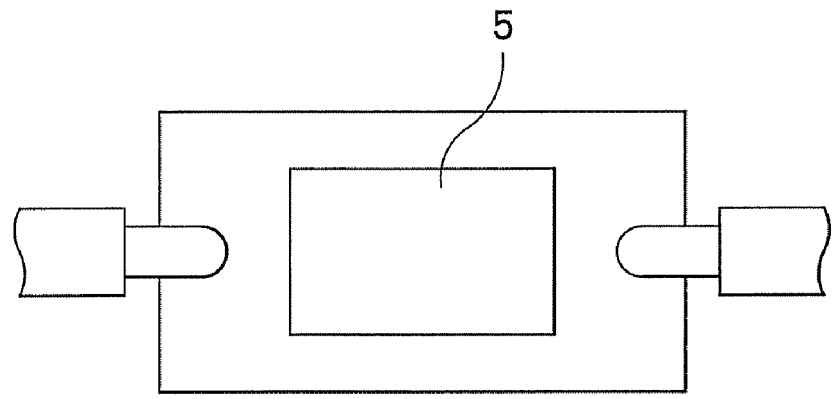
NO VOLTAGE APPLIED
(b)
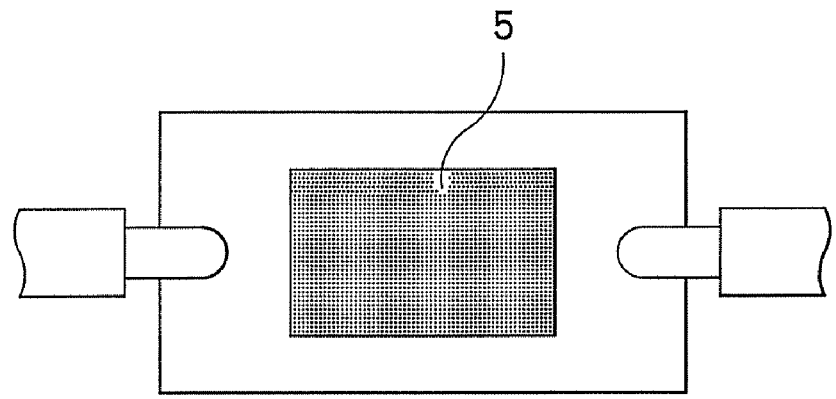
VOLTAGE APPLIED
(30Hz, ±6V)
FIG. 3

US 8,018,138 B2

LIQUID LIGHT-EMITTING ELEMENT, LIGHT-EMITTING DEVICE, METHOD FOR MAKING LIGHT-EMITTING DEVICE, AND LIGHT-EMITTING BODY

FIELD OF THE INVENTION

The present invention relates to a light-emitting device comprising a pair of baseplates respectively having surfaces facing each other, each surface having an electrode formed thereon, and a light-emitting layer sandwiched between the two baseplates. Particularly, the present invention relates to a liquid light-emitting elements, a light-emitting device, and a method for making a light-emitting device that are highly safe and do not deteriorate in emission characteristics. The present invention also relates to a light-emitting body formed in mass.

BACKGROUND OF THE INVENTION

The development of light-emitting devices such as organic EL displays has advanced swiftly in recent years. Since light-emitting elements for use in the light-emitting devices as organic EL displays are of the self-emission type, they can be made smaller in thickness and lighter in weight as compared with liquid crystalline light-receiving elements, which require backlight. Moreover, since these light-emitting elements for use in organic EL displays are self-light-emitting ones, they provide high visibility as compared with liquid crystalline light-receiving elements. Organic EL displays, therefore, have the following advantages: they are excellent in visibility, can display images at high speeds, can be driven at low voltages, and can be produced thinner.

Generally, an organic EL display comprises a pair of baseplates respectively having surfaces facing each other, each surface having an electrode formed thereon, and a light-emitting layer sandwiched between the two baseplates, and the light-emitting layer contains a light-emitting material that emits light when voltage is applied to it. The light-emitting layer has a thickness of several hundreds nanometers. Hence, the distance between the two electrodes that face each other is short, and the electrodes easily come in contact with each other. Further, since direct voltage is applied to the light-emitting layer in the organic EL display, impurities readily accumulate on the electrode-electrode interface, which leads to decrease in the operation life of the light-emitting layer.

In order to solve the above problems, there have been developed light-emitting devices that employ light-emitting layers made from liquids produced by electrochemical reactions (see Patent Documents 1 to 3, and Non-Patent Documents 1 and 2, for example). In each one of the light-emitting devices disclosed in Patent Documents 1 and 2 and Non-Patent Documents 1 and 2, the distance between two electrodes is several micrometers or more. Therefore, the electrodes never come into contact with each other. Further, since alternating voltage is applied to light-emitting layers in the light-emitting devices disclosed in Patent Documents 1 to 3 and Non-Patent Document 1, it is possible to solve the problem that the operation life of the light-emitting layers undergo a decrease.

[Patent Document 1] Japanese Laid-Open Patent Publication No. 2007-139899
[Patent Document 2] Japanese Laid-Open Patent Publication No. 2006-301302
[Patent Document 3] Japanese Laid-Open Patent Publication No. 2005-302332
[Non-Patent Document 1] Toshiba Review, Vol. 60, No. 9, p. 33 (2005)
[Non-Patent Document 2] Journal of the Electrochemical Society, Vol. 152 (8), p. A1677 (2005)

SUMMARY OF THE INVENTION

Each of the light-emitting devices 21 disclosed in Patent Documents 1 and 2 and Non-Patent Documents 1 and 2 comprises a pair of baseplates 23 respectively having surfaces facing each other, each surface having an electrode 24 formed thereon, and a light-emitting layer 25 using a light-emitting material 28 dissolved in an electrolyte consisting of an organic solvent 26 and a supporting electrolyte 27, sandwiched between the two baseplates 23, as shown in FIG. 5. Since an organic solvent 26 which is used for the light-emitting layer 25 is inflammable, there is a question about safety in handling the light-emitting layer 25.

Further, the organic solvent 26 is volatile and thus volatilizes relatively easily. Therefore, the concentration of the organic solvent 26 in the light-emitting layer 25 changes, and this causes another problem that the light-emitting layer 25 deteriorates and becomes poor in emission characteristics.

Furthermore, in the above light-emitting layer 25 using an organic solvent 26, it is necessary to dissolve a supporting electrolyte 27 in the organic solvent 26 so as to cause the light-emitting layer 25 to emit light satisfactorily. The use of an organic solvent 26, therefore, leads to increase in the number of constituent materials of the light-emitting layer 25.

The present invention was accomplished in view of the aforementioned drawbacks. Accordingly, an object of the present invention is to provide a liquid light-emitting element, a light-emitting device, a method for making a light-emitting device, and a light-emitting body that use no organic solvent, are highly safe, do not deteriorate in emission characteristics, and require only a decreased number of constituent materials.

The present invention is a light-emitting device comprising: a pair of baseplates respectively having surfaces facing each other, each surface having an electrode formed thereon; a light-emitting layer sandwiched between the two baseplates; wherein the light-emitting layer contains an ionic liquid and a light-emitting material dissolved in the ionic liquid.

The present invention is the light-emitting device, wherein the ionic liquid remains liquefied at normal temperatures.

The present invention is a light-emitting device comprising: a pair of baseplates respectively having surfaces facing each other, each surface having an electrode formed thereon; a light-emitting layer sandwiched between the two baseplates; wherein the light-emitting layer contains an ionic liquid, a light-emitting material dissolved in the ionic liquid, and a gelling agent for turning the ionic liquid into a gel.

The present invention is the light-emitting device, wherein the gelling agent comprises any one of nanometer-sized fine particles of silica and nanometer-sized fine particles of titanium oxide.

The present invention is the light-emitting device, wherein the light-emitting layer emits light when alternating voltage is applied to it.

The present invention is the light-emitting device wherein the ionic liquid contains a material selected from aliphatic system, imidazolium system, and pyridium system.

The present invention is the light-emitting device, wherein the light-emitting material contains a material selected from ruthenium compounds or complexes, PVB (polyvinylbutyral), DPA (9,10-diphenylanthracene), and perylene.

The present invention is a liquid light-emitting element comprising: a pair of electrodes; and a light-emitting layer sandwiched between the two electrodes; wherein the light-emitting layer contains an ionic liquid and a light-emitting material dissolved in the ionic liquid.

The present invention is a method for making a light-emitting device, comprising: preparing a pair of baseplates respectively having surfaces, each surface having an electrode formed thereon; placing the two baseplates so that the surfaces having the electrode formed thereon face each other; dissolving a light-emitting material in an ionic liquid; and pouring the ionic liquid in which the light-emitting material has been dissolved, into a space between the two baseplates, thereby forming a light-emitting layer.

The present invention is a method for making a light-emitting device, comprising: preparing a pair of baseplates respectively having surfaces, each surface having an electrode formed thereon; dissolving a light-emitting material in an ionic liquid; applying the ionic liquid in which the light-emitting material has been dissolved, to the surface of one of the two baseplates, on which the electrode is formed, thereby forming a light-emitting layer; and placing the other baseplate on the light-emitting layer so that the surface of the other baseplate, on which the electrode is formed, faces toward the light-emitting layer.

The present invention is a method for making a light-emitting device, comprising: preparing a pair of baseplates respectively having surfaces, each surface having an electrode formed thereon; placing the two baseplates so that the surfaces having the electrode formed thereon face each other; dissolving a light-emitting material in an ionic liquid; adding a gelling agent for turning the ionic liquid into a gel, to the ionic liquid in which the light-emitting material has been dissolved; and pouring the ionic liquid in which the light-emitting material has been dissolved and to which the gelling agent has been added, into a space between the two baseplates, thereby forming a light-emitting layer.

The present invention is a method for making a light-emitting device, comprising: preparing a pair of baseplates respectively having surfaces, each surface having an electrode formed thereon; dissolving a light-emitting material in an ionic liquid; adding a gelling agent for turning the ionic liquid into a gel, to the ionic liquid in which the light-emitting material has been dissolved; applying the ionic liquid in which the light-emitting material has been dissolved and to which the gelling agent has been added, to the surface of one of the two baseplates, on which the electrode is formed, thereby forming a light-emitting layer; and placing the other baseplate on the light-emitting layer so that the surface of the other baseplate, on which the electrode is formed, faces toward the light-emitting layer.

The present invention is a light-emitting body, comprising: an ionic liquid; a light-emitting material dissolved in the ionic liquid; and a gelling agent for turning the ionic liquid into a gel; wherein the light-emitting body is formed in mass.

The present invention is a light-emitting device comprising: a supporting substrate having a surface, said surface having a first electrode formed thereon; a light-emitting body placed on the surface of the supporting substrate; and a second electrode that is in contact with the light-emitting body; wherein the light-emitting body contains an ionic liquid, a light-emitting material dissolved in the ionic liquid, and a gelling agent for turning the ionic liquid into a gel, and is formed in mass.

The present invention is a method for making a light-emitting device, comprising: preparing a supporting substrate having a surface, said surface having a first electrode formed thereon; dissolving a light-emitting material in an ionic liquid; adding a gelling agent for turning the ionic liquid into a gel, to the ionic liquid in which the light-emitting material has been dissolved; forming the ionic liquid in which the gelling agent has been added, in mass, thereby obtaining a light-emitting body; placing the light-emitting body on the surface of the supporting substrate; and bringing a second electrode into contact with the light-emitting body.

The light-emitting layer in the present invention comprises an ionic liquid and a light-emitting material dissolved in the ionic liquid, and any organic solvent, which is inflammable, is not used to form it. The ionic liquid, a component of the light-emitting layer, is nonflammable, so that the light-emitting layer can be handled relatively safely as compared with a light-emitting layer using an organic solvent, which is inflammable. Further, while organic solvents are volatile and thus vaporize easily, the ionic liquid to be used for the light-emitting layer in the present invention is non-volatile and does not vaporize, so that it is possible to prevent the light-emitting layer from degrading and to retain stably its quality without experiencing deterioration in emission characteristics. Furthermore, if an organic solvent is used for forming a light-emitting layer, it is necessary to dissolve a supporting electrolyte in the organic solvent; however, in the present invention, since the ionic liquid is used to form the light-emitting layer, a supporting electrolyte need not be dissolved additionally in the ionic liquid. Therefore, it is possible to decrease the number of material constituting the light-emitting layer.

Furthermore, since the light-emitting layer in the present invention comprises an ionic liquid, a light-emitting material dissolved in the ionic liquid, and a gelling agent for turning the ionic liquid into a gel, it is possible to turn the ionic liquid in which the light-emitting material has been dissolved, into a gel. Thus the addition of the gelling agent prevents leakage of the ionic liquid in which the light-emitting material has been dissolved, and makes the light-emitting layer stably retain its quality over a long period of time without experiencing deterioration in emission characteristics.

Furthermore, since the light-emitting body of the present invention comprises an ionic liquid, a light-emitting material dissolved in the ionic liquid, and a gelling agent for turning the ionic liquid into a gel, it is possible to turn the ionic liquid in which the light-emitting material has been dissolved, into a gel, and to form the light-emitting body in mass. Therefore, the light-emitting body formed in mass, that is exposed, can retain its shape without being sealed.

BRIEF DESCRIPTION OF THE DRAWINGS

FIG. 3($a$) is a view showing the state of a light-emitting device according to the first embodiment of the present invention, to which no voltage is applied, and FIG. 3($b$) is a view showing the state of the light-emitting device in which a voltage-applied light-emitting layer is emitting light.

DETAILED DESCRIPTION OF THE INVENTION

First Embodiment

Figure 1:
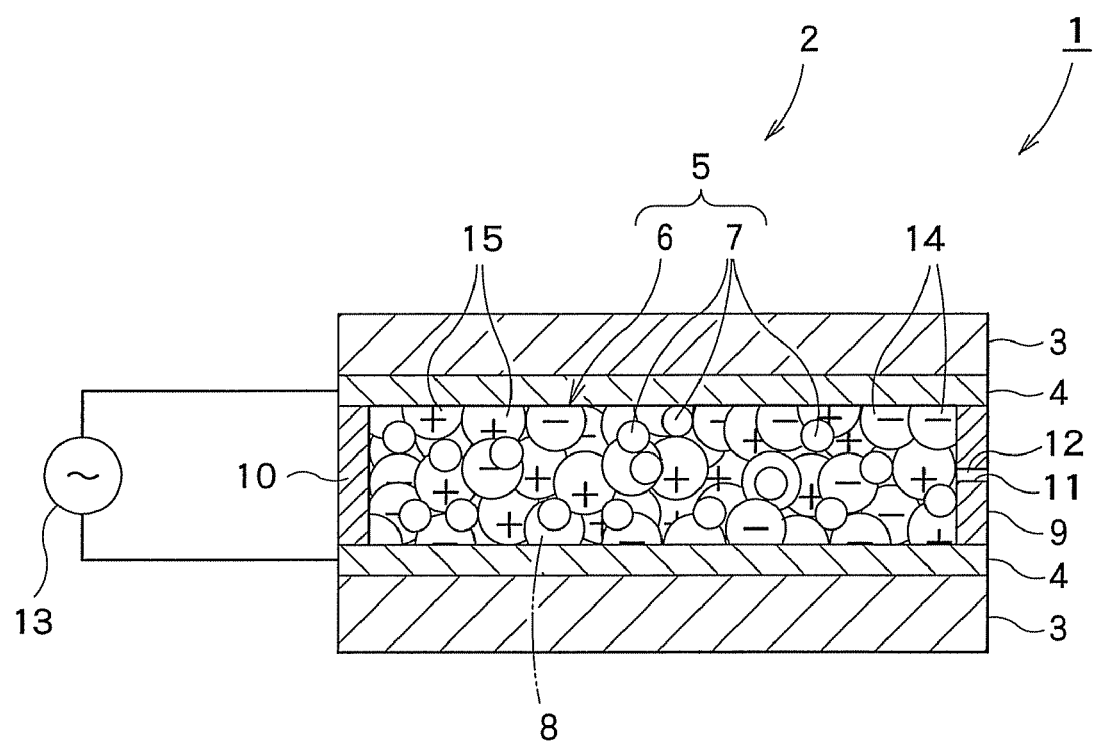
FIG. 1 is a sectional view of a light-emitting device according to the first embodiment of the present invention.
Figure 2:
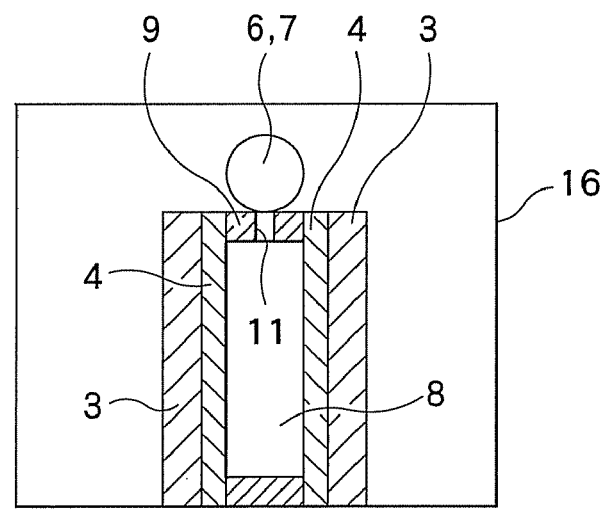
FIG. 2 is a schematic view showing a method for making a light-emitting device according to the first embodiment of the present invention.

Embodiments of the present invention will be described with reference to the accompanying drawings. FIGS. 1 to 3 are views showing a first embodiment of the light-emitting device according to the present invention. FIG. 1 is a sectional view of a light-emitting device according to the first embodiment of the present invention. FIG. 2 is a schematic view showing a method for making a light-emitting device according to the first embodiment of the present invention. FIG. 3(*a*) is a view showing the state of a light-emitting device according to the first embodiment of the present invention, to which no voltage is applied, and FIG. 3(*b*) is a view showing the state of the light-emitting device in which a voltage-applied light-emitting layer is emitting light.

A light-emitting device 1 according to the present invention will be first described with reference to FIG. 1. The light-emitting device 1 emits light when voltage is applied to it and is used for a variety of display devices.

As FIG. 1 shows, the light-emitting device 1 comprises a pair of baseplates 3 respectively having surfaces facing each other, each surface having an electrode 4 formed thereon, and a light-emitting layer 5 sandwiched between the two baseplates 3. The light-emitting layer 5 contains an ionic liquid 6 and a light-emitting material 7 dissolved in the ionic liquid 6. Between the two baseplates 3, a pair of spacers 9, 10 for keeping the distance (gap) between the two electrodes 4 constant are placed so as to surround the light-emitting layer 5. 1 µm or more and 100 µm or less is sufficient for the distance between the electrodes 4, and it is preferable to make the distance from 5 µm to 30 µm. One spacer 9 of the two spacers 9, 10 placed between the two baseplates 3 has a pore 11 through which the ionic liquid 6 in which the light-emitting material 7 has been dissolved is injected into a space between the baseplates 3. The pore 11 is sealed with a sealing material 12 after injecting, into a space between the baseplates 3, the ionic liquid 6 in which the light-emitting material 7 has been dissolved.

The two electrodes 4 and the light-emitting layer 5 sandwiched between them constitute a liquid light-emitting element 2 of the light-emitting device 1.

As shown in FIG. 1, the electrodes 4 formed on the baseplates 3 are connected to an AC power supply 13 with which voltage is applied to the light-emitting layer 5.

The ionic liquid 6 is also called a fused salt and consists only of ions that remain liquefied at normal temperatures. The ionic liquid 6 has such properties as nonflammability and non-volatility, unlike a liquid electrolyte prepared by dissolving a supporting electrolyte in an organic solvent. To cause an electrochemical reaction inside the light-emitting layer 5 made from the ionic liquid 6 in which the light-emitting material 7 has been dissolved, it is necessary to apply only a lower voltage to the light-emitting layer 5, and, moreover, it is possible to cause a rapid reduction-oxidation reaction.

It is desirable to use, as the ionic liquid 6, a material having high polarity so that it can dissolve a wide variety of light-emitting materials 7 to give a solution with a high light-emitting material content, and a material selected from aliphatic system, imidazolium system, and pyridium system, for example, can be used. Of these, 1-allyl-3-alkylimidazolium can be favorably used.

Any material can be used as the light-emitting material 7 as long as it exhibits electrochemiluminescence. Examples of such materials useful herein include PVB (polyvinylbutyral), DPA (9,10-diphenylanthracene), perylene, and Ru (ruthenium) compounds or complexes such as $RuCl_6$, $RuPF_6$, $Ru(bpy_3)Cl_2$ and $Ru(d_8\text{-}bpy_3)PF_6$. Although no particular limitation is imposed on the light-emitting material 7 content in the ionic liquid 6, it is desirable that the light-emitting material 7 content in the ionic liquid 6 be 10% by weight or less, preferably between 1% and 50% by weight.

Any material can be used as the baseplate 3 as long as it is transparent in order to extract light emitted from the light-emitting material 7 to the outside, and a glass plate, a film, or the like can be used.

Any material can be used to form the electrode 4 on one surface of each baseplate 3 as long as it is transparent, and ITO (Indium Tin Oxide) or the like can be favorably used.

Next, a method for making a light-emitting device according to this embodiment will be described.

First, a pair of baseplates 3 respectively having surfaces, each surface having an electrode 4 formed thereon, is prepared. In this step, two baseplates 3 of the desired size and thickness are first prepared, and an electrode 4 is formed on one surface of each baseplate 3. The two baseplates 3 are placed so that the surfaces having the electrode 4 formed thereon face each other, and then stuck together with spacers 9, 10 between them, thereby an empty cell 8 is defined by the two baseplates 3 and the two spacers 9, 10 placed between them.

A light-emitting material 7 is dissolved in an ionic liquid 6. In this step, the ionic liquid 6 is mixed with a light-emitting material 7 so that the desired light-emitting material 7 content in the ionic liquid 6 is obtained. The mixture is stirred at a predetermined temperature for a predetermined time, whereby the light-emitting material 7 can be fully dissolved in the ionic liquid 6.

After this, the ionic liquid 6 in which the light-emitting material 7 has been dissolved is poured into a space between the two baseplates 3. In this step, the baseplates 3 stuck together with the spacers 9, 10 between them to form the empty cell 8 is placed in an injection bath 16, as shown in FIG. 2. The air in the empty cell 8 between the two baseplates 3 is evacuated together with the air in the injection bath 16 to form a vacuum. Then the ionic liquid 6 in which the light-emitting material 7 has been dissolved is dropped on the pore 11 of the spacer 9, and the pressure in the injection bath 16 is recovered. By this operation, the ionic liquid 6 in which the light-emitting material 7 has been dissolved is vacuum-injected into the empty cell 8. Since the ionic liquid 6 in which the light-emitting material 7 has been dissolved is non-volatile, it does not vaporize while it is vacuum-injected into the empty cell 8. Therefore, it is possible to prevent the light-emitting layer 5 made up of the ionic liquid 6 and the light-emitting material 7 from degrading and becoming poor in emission characteristics. Alternatively, after evacuating the air in the empty cell 8 to form a vacuum, the ionic liquid 6 in which the light-emitting material 7 has been dissolved may be injected into the empty cell 8 by capillary action, by submerging the pore 11 of the spacer 9 in the ionic liquid 6 in which the light-emitting material 7 has been dissolved.

After this, the baseplates 3 stuck together with the spacers 9, 10 between them are taken out from the injection bath 16, and the pore 11 of the spacer 9 is sealed with a sealing material 12. In this manner, a light-emitting layer 5 made up of the ionic liquid 6 and the light-emitting material 7 is formed between the two baseplates 3, and a light-emitting device 1 is finally obtained.

An embodiment of the use of the light-emitting device having the above structure will be described below.

In the light-emitting device 1 according to this embodiment, alternating voltage is first applied to the light-emitting layer 5 from the AC power supply 13 via the two electrodes 4 to cause the light-emitting layer 5 to emit light. In this step, an electrochemical reduction reaction occurs in the vicinity of the electrode 4 acting as cathode, and the ionic liquid 6 and the light-emitting material 7 give radical anions 14. On the other hand, an electrochemical oxidation reaction occurs in the vicinity of the other electrode 4 acting as anode, and the ionic liquid 6 and the light-emitting material 7 give radical cations 15.

In the above process, since alternating voltage is applied to the electrodes 4, reduction and oxidation reactions alternately occur on the electrodes 4. Namely, the radical anions 14 produced by a reduction reaction in the vicinity of one of the electrodes 4 (first electrode) move towards the other electrode 4 (second electrode) that faces the first electrode 4. Then, reversal of the polarity of each electrode 4 takes place, and radical cations 15 are produced by an oxidation reaction in the vicinity of the first electrode 4. While this process is proceeding, the radical anions 14 moving from the vicinity of the first electrode 4 towards the second electrode 4 return to the first electrode 4, and thus the radical anions 14 collide with the radical cations 15. In this collision, the radical anions 14 and the radical cations 15 give neutral molecules in the ground state and those in the excited state. The neutral molecules in the excited state are deactivated to emit light. In this manner, the light-emitting layer 5, to which no voltage has been applied as shown in FIG. 3(a), comes to emit light as shown in FIG. 3(b). FIG. 3(b) is a view showing that the light-emitting layer 5 to which a voltage of ±6 V at 30 Hz is applied is emitting light.

Figure 8:
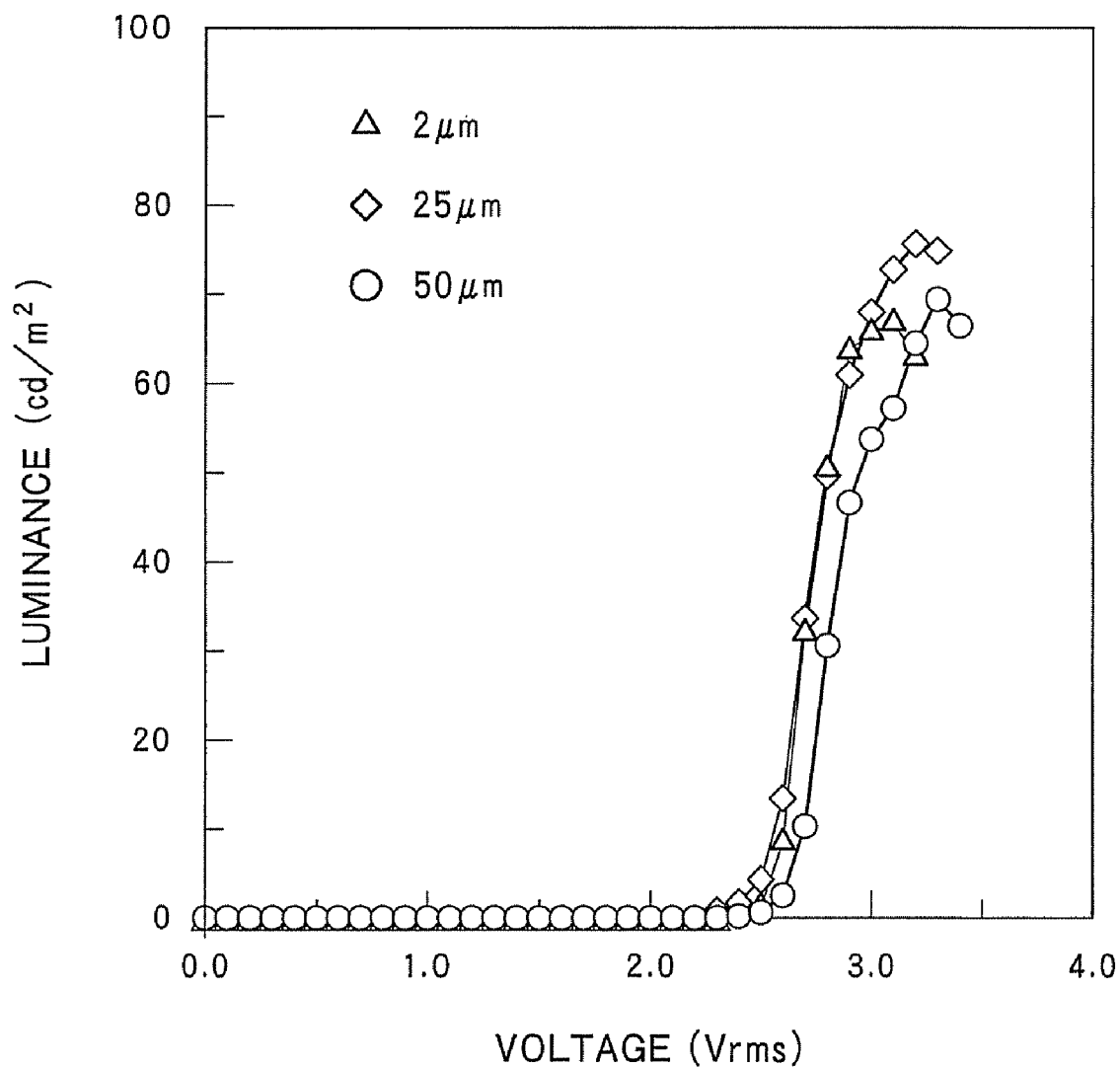
FIG. 8 is a graph showing the relationship between voltage and luminance, where the thickness of the light-emitting layer is a parameter.

The above-described mechanism of the luminescence of the light-emitting layer 5 can be explained with reference to FIG. 8 that shows the relationship between voltage and luminance, where the thickness of the light-emitting layer 5 is a parameter. Namely, as shown in FIG. 8, even when the thickness of the light-emitting layer 5 is varied from 2 µm to 25 µm and to 50 µm, the luminance does not change greatly. This demonstrates that the radical anions 14 and the radical cations 15 collide with each other in the vicinity of each electrode 4 without moving between the electrodes 4, causing the light-emitting layer 5 to emit light.

As described above, the light-emitting layer 5 in this embodiment comprises the ionic liquid 6 and the light-emitting material 7 dissolved in the ionic liquid 6, and no organic solvent, which is inflammable, is not used to form it. Since the ionic liquid 6 of the light-emitting layer 5 in this embodiment is nonflammable, the light-emitting layer 5 can be handled relatively safely as compared with a light-emitting layer using an organic solvent, which is inflammable. Further, while organic solvents are volatile and thus vaporize easily, the ionic liquid 6 contained in the light-emitting layer 5 in this embodiment is non-volatile and does not vaporize, so that it is possible to prevent the light-emitting layer 5 from degrading and to retain stably its quality without experiencing deterioration in emission characteristics. Furthermore, in this embodiment, the ionic liquid 6 can be subjected to vacuum injection when forming the light-emitting layer 5. Therefore, the light-emitting layer 5 can be formed in a shorter time as compared with a case where an organic solvent, which is volatile and whose vacuum injection is difficult, is used to form a light-emitting layer. Moreover, in this embodiment, since the ionic liquid 6 is used to form the light-emitting layer 5, it is not necessary to dissolve a supporting electrolyte in the ionic liquid 6. Thus, it is possible to decrease the number of materials used in the light-emitting layer 5.

Second Embodiment

Figure 4:
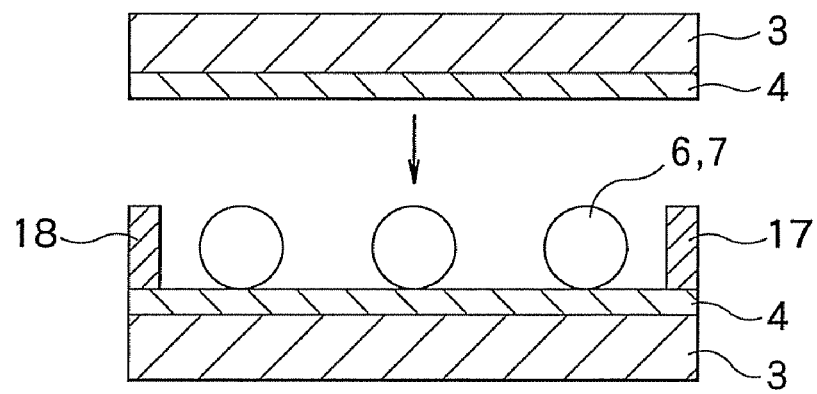
FIG. 4 is a schematic view showing a method for making a light-emitting device according to the second embodiment of the present invention.
Figure 5:
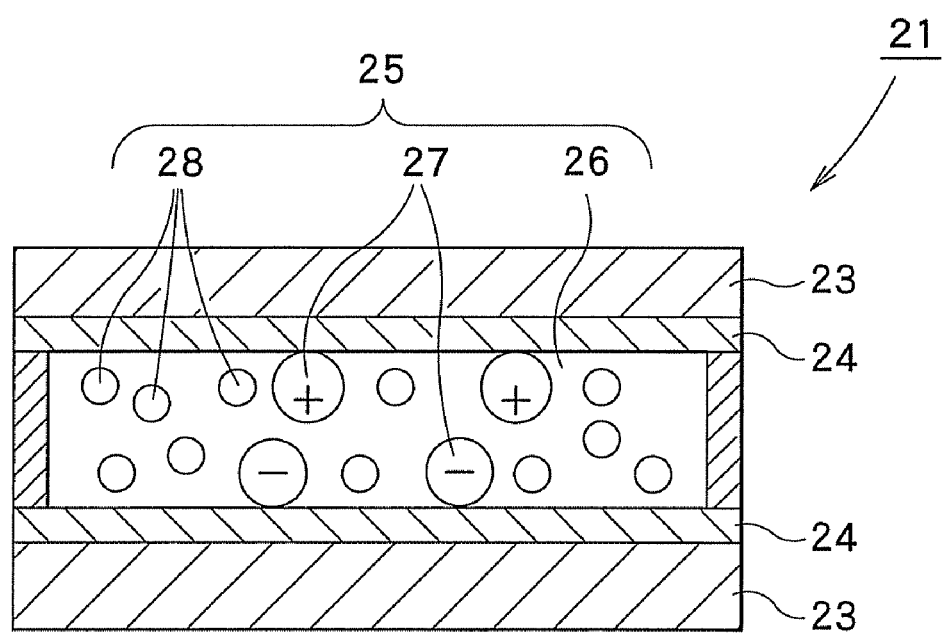
FIG. 5 is a sectional view of a conventional light-emitting device.

The second embodiment of the present invention will be described hereinafter with reference to FIG. 4. FIG. 4 is a schematic view showing a method for making a light-emitting device 1 according to the second embodiment of the present invention.

The second embodiment shown in FIG. 4 is basically the same as the first embodiment shown in FIGS. 1 to 3, except that the ionic liquid in which the light-emitting material has been dissolved is applied to one of the two baseplates. Like reference numerals designate like or corresponding parts throughout the views of FIG. 4 showing the second embodiment and of FIGS. 1 to 3 showing the first embodiment. Those parts whose explanation has been given in the description of the first embodiment will not be explained below any more.

In the method for making a light-emitting device according to this embodiment, a pair of baseplates 3 respectively having surfaces, each surface having an electrode 4 formed thereon, is first prepared. In this step, two baseplates 3 of the desired size and thickness are first prepared, and an electrode 4 is formed on one surface of each baseplate 3. Spacers 17, 18 are attached to the surface of one of the two baseplates (first baseplate)$_3$, on which the electrode 4 is formed, so that they will surround a light-emitting layer 25 that will be described later.

A light-emitting material 7 is dissolved in an ionic liquid 6. In this step, the light-emitting material 7 is mixed with the ionic liquid 6 so that the desired light-emitting material 7 content in the ionic liquid 6 can be obtained. The mixture is stirred at a predetermined temperature for a predetermined time, whereby the light-emitting material 7 can be fully dissolved in the ionic liquid 6.

The ionic liquid 6 in which the light-emitting material 7 has been dissolved is dropped on and applied to the surface of the first baseplate 3, on which the electrode 4 is formed, to form a light-emitting layer 5.

Subsequently, the other baseplate (second baseplate) 3 is placed on the light-emitting layer 5 so that its surface having electrode 4 formed thereon faces toward the light-emitting layer 5 and are stuck together with the spacers 17, 18 between them, the light-emitting layer 5 made up of the ionic liquid 6 and the light-emitting material 7 being disposed between the baseplates 3. In this manner, a light-emitting device 1 is finally obtained.

The light-emitting layer 5 in this embodiment comprises the ionic liquid 6 and the light-emitting material 7 dissolved in the ionic liquid 6, and any organic solvent, which is volatile, is not used to form the light-emitting layer 5. It is difficult to apply an organic solvent on the surface of the first baseplate 3, on which the electrode 4 is formed, because it is volatile and thus vaporizes easily. On the other hand, since the ionic liquid 6 of the light-emitting layer 5 is non-volatile, it can be applied to the surface of the first baseplate 3, on which the electrode 4 is formed. The light-emitting layer 5, therefore, can be formed in a shorter time.

Third Embodiment

Figure 6:
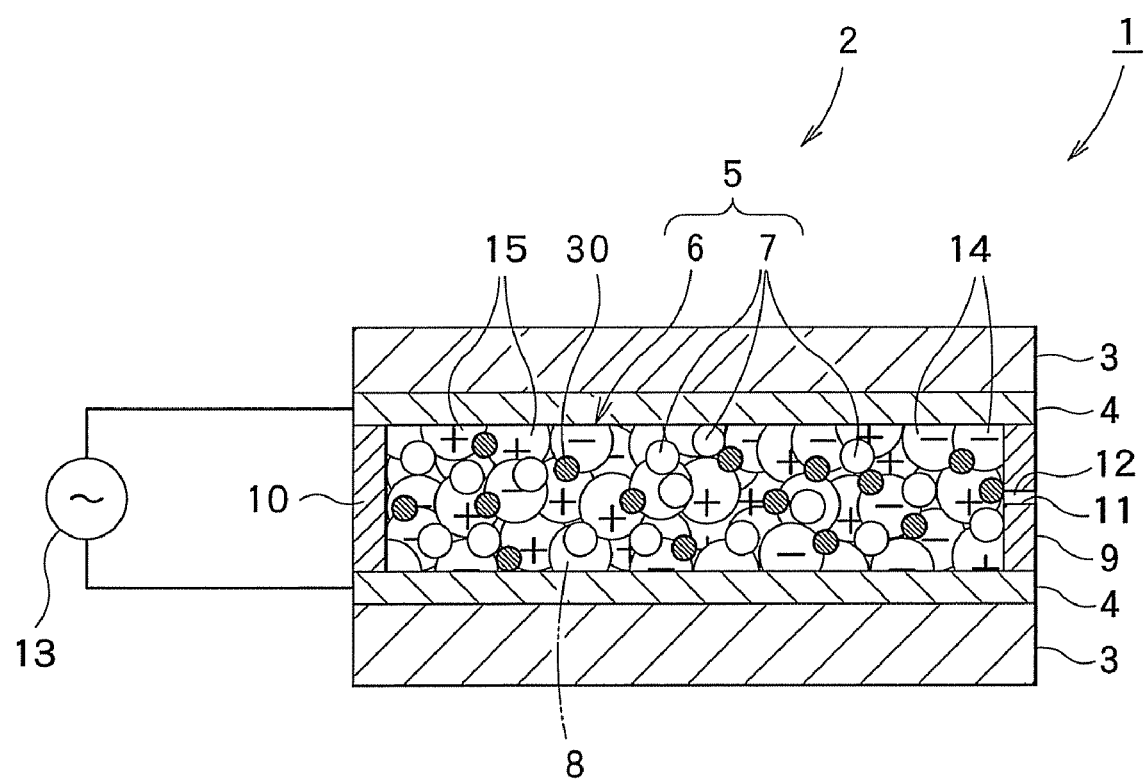
FIG. 6 is a sectional view of a light-emitting device according to the third embodiment of the present invention.

The third embodiment of the present invention will be described hereinafter with reference to FIG. 6. FIG. 6 is a sectional view of a light-emitting device according to the third embodiment of the present invention.

The third embodiment shown in FIG. 6 is basically the same as the first embodiment shown in FIGS. 1 to 3 and the second embodiment shown in FIG. 4, except that a gelling agent for turning the ionic liquid into a gel is added to the ionic liquid in which the light-emitting material has been dissolved. Like reference numerals designate like or corresponding parts throughout the views of FIG. 6 showing the third embodiment and of FIGS. 1 to 3 showing the first embodiment. Those parts whose explanation has been given in the description of the first embodiment will not be explained below any more.

A light-emitting layer 5 comprises an ionic liquid 6, a light-emitting material 7 dissolved in the ionic liquid 6, and a gelling agent 30 for turning the ionic liquid 6 into a gel, as shown in FIG. 6.

In this embodiment, after dissolving the light-emitting material 7 in the ionic liquid 6, a gelling agent 30 for turning the ionic liquid 6 into a gel is added to the ionic liquid 6 in which the light-emitting material 7 has been dissolved, and the mixture is stirred for a predetermined time. By doing so, it is possible to turn the ionic liquid 6 in which the light-emitting material 7 has been dissolved into a gel.

That the ionic liquid 6 is turned into a gel means that the ionic liquid 6 loses its fluidity. It is preferable to use, as the gelling agent, nanometer-sized fine particles of silica or titanium oxide.

The amount of the gelling agent to be added is desirably 1% to 15% by weight, particularly 3% to 7% by weight.

In this embodiment, since the gelling agent 30 is added to the ionic liquid 6 in which the light-emitting material 7 has been dissolved, the ionic liquid 6 in which the light-emitting material 7 has been dissolved can be turned into a gel. Thus the addition of the gelling agent 30 prevents leakage, from the cell 8, of the ionic liquid 6 in which the light-emitting material 7 has been dissolved, and makes the light-emitting layer 5 stably retain its quality over a long period of time without experiencing deterioration in emission characteristics.

As mentioned previously with reference to FIG. 8, the radical anions 14 and the radical cations 15 in the light-emitting layer 5 collide with each other to emit light in the vicinity of each electrode 4, without moving between the electrodes 4. Also in the light-emitting layer 5 in this embodiment, made from the gelled ionic liquid 6, the radical anions 14 and the radical cations 15 collide with each other in the vicinity of each electrode 4, causing the light-emitting layer 5 to emit light.

Fourth Embodiment

Figure 9:
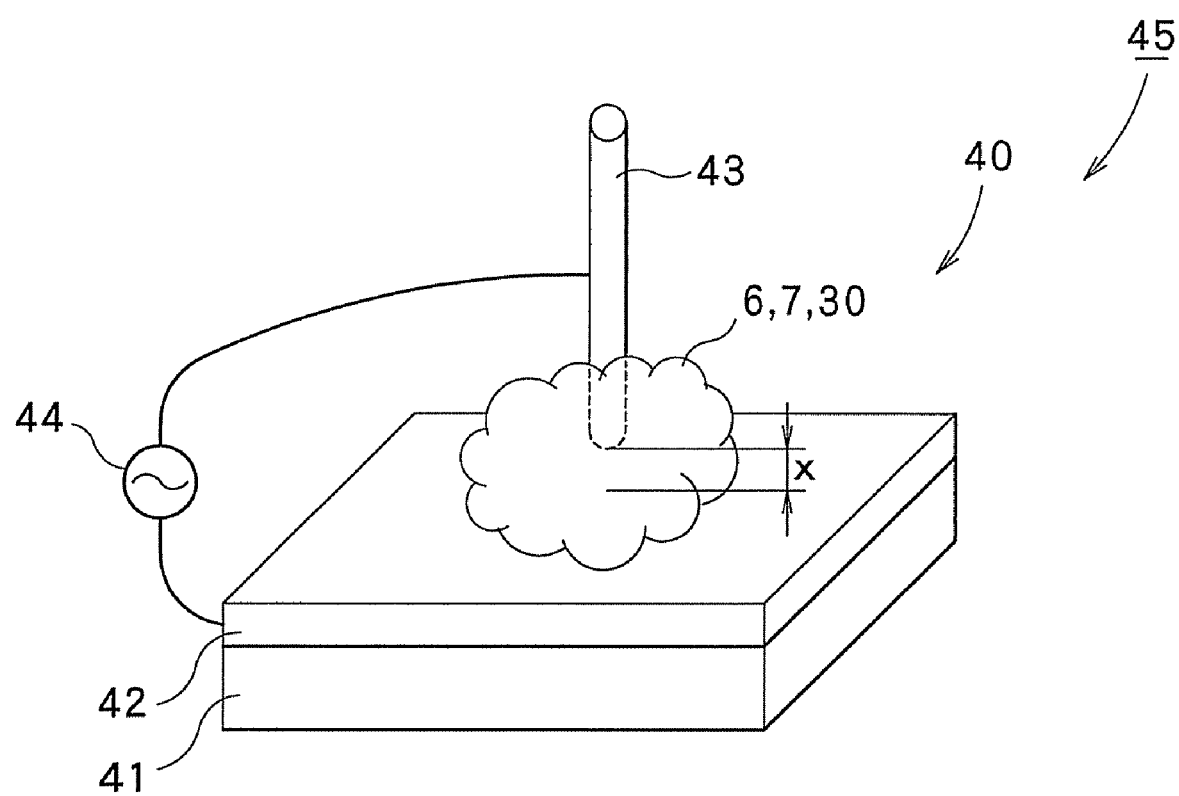
FIG. 9 is a view showing a light-emitting device according to the fourth embodiment of the present invention, comprising a light-emitting body.

The fourth embodiment of the present invention will be described hereinafter with reference to FIG. 9. FIG. 9 is a view showing a light-emitting device according to the fourth embodiment of the present invention, comprising a light-emitting body.

The fourth embodiment shown in FIG. 9 is basically the same as the third embodiment shown in FIG. 6, except that the gelled ionic liquid is formed in mass. Like reference numerals designate like or corresponding parts in the views of FIGS. 9 and 6 that show the fourth embodiment and the third embodiment, respectively. Those parts whose explanation has been given in the description of the third embodiment will not be explained below any more.

A light-emitting device 45 shown in FIG. 9 comprises a baseplate (supporting substrate) 41 having a surface, said surface having an electrode (first electrode) 42 formed thereon, and a light-emitting body 40 placed on the surface of the baseplate 41, the light-emitting body 40 containing an ionic liquid 6, a light-emitting material 7 dissolved in the ionic liquid 6, and a gelling agent 30 for turning the ionic liquid 6 into a gel and being formed in mass.

A wire (second electrode) 43 is inserted into the light-emitting body 40 from above, where the light-emitting body 40 and the inserted portion of the wire 43 are in contact with each other. The diameter of the wire 43 is 1 mm, and the distance x between the tip of the wire 43 and the upper surface of the electrode 42, shown in FIG. 9, is 2 mm. The electrode 42 and the wire 43 are connected to an AC power supply 44 with which alternating voltage is applied to the light-emitting body 40.

A glass plate, a film, or the like can be used as the baseplate 41. In the case where light emitted from the light-emitting body 40 is extracted from the top or side of it to the outside, materials useful for the baseplate 41 are not limited to transparent ones.

ITO can be used for the electrode 42 to be formed on the surface of the baseplate 41 and for the wire 43. In the case where light emitted from the light-emitting body 40 is extracted from the top or side of it to the outside, materials useful for the electrode 42 and for the wire 43 are not limited to transparent ones. In this case, such metals as gold (Au), silver (Ag), aluminum (Al), tin (Sn), and bismuth (Bi) can be used for the electrode 42 and the wire 43. Thus it is possible to cause the light-emitting body 40 to emit light with the use of a relatively inexpensive material, without using ITO containing indium, rare metal.

To make the light-emitting device shown in FIG. 9, a baseplate 41 having a surface on which a first electrode 42 is formed, is first prepared.

To an ionic liquid 6 in which a light-emitting material 7 has been dissolved, a gelling agent 30 for turning the ionic liquid 6 into a gel is added. The mixture is stirred for a predetermined time to turn, into a gel, the ionic liquid 6 in which the light-emitting material 7 has been dissolved. The gelled ionic liquid 6 is formed in mass, and a light-emitting body 40 is thus obtained.

The light-emitting body 40 formed in mass is placed on the surface of the baseplate 41, and a wire 43 is inserted into the light-emitting body 40 from outside. In this manner, a light-emitting device 45 shown in FIG. 9 is finally obtained.

A method for causing the light-emitting body 40 in the light-emitting device 45 to emit light will be described below. First, alternating voltage is applied to the light-emitting body 40 from the AC power supply 44 via the electrode 42 and the wire 43. In this step, an electrochemical reduction reaction occurs in the vicinity of the electrode 42 acting as cathode, and the ionic liquid 6 and the light-emitting material 7 give radical anions 14. On the other hand, an electrochemical oxidation reaction occurs in the vicinity of the inserted (into the light-emitting body 40) portion of the wire 43 acting as anode, and the ionic liquid 6 and the light-emitting material 7 give radical cations 15.

During the application of alternating voltage to the light-emitting body 40, alternating voltage is applied to the electrode 42 and the wire 43, so that reduction and oxidation reactions alternately occur on the electrode 42 and the wire 43. Namely, for example, the radical anions 14 produced by a reduction reaction in the vicinity of the electrode 42 move towards the inserted (into the light-emitting body 40) portion of the wire 43. Then, reversal of the polarity of the electrode 42 and that of the polarity of the wire 43 take place, and in the vicinity of the electrode 42, radical cations 15 are produced by an oxidation reaction. In this process, the radical anions 14 moving from the vicinity of the electrode 42 towards the inserted (into the light-emitting body 40) portion of the wire 43 return to the electrode 42. Thus the radical anions 14 and the radical cations 15 collide with each other to give neutral molecules in the ground state and those in the excited state. The neutral molecules in the excited state are deactivated to emit light.

Similarly, the radical anions 14 and the radical cations 15 collide with each other in the vicinity of the inserted (into the light-emitting body 40) portion of the wire 43 to give molecules in the excited state, and these molecules emit light.

Also in the light-emitting body 40 shown in FIG. 9, the radical anions 14 and the radical cations 15 collide with each other to emit light in the vicinity of the electrode 42, and also in the vicinity of the inserted (into the light-emitting body 40) portion of the wire 43. For this reason, even when the distance x between the electrode 42 and the tip of the wire 43 is relatively large, it is possible to cause the light-emitting body 40 to emit light.

Since the light-emitting body 40 in this embodiment comprises an ionic liquid 6, a light-emitting material 7 dissolved in the ionic liquid 6, and a gelling agent 30 for turning the ionic liquid 6 into a gel, it is possible to turn the ionic liquid 6 in which the light-emitting material 7 has been dissolved, into a gel, and to form the light-emitting body 40 in mass. The gelled ionic liquid 6 formed in mass, that is exposed, can retain its shape without being sealed.

Further, in this embodiment, it is possible to cause the light-emitting body 40 to emit light by placing the light-emitting body 40 formed in mass on the electrode 42-formed surface of the baseplate 41, inserting the wire 43 into the light-emitting body 40 from above, and applying alternating voltage to the light-emitting body 40 via the electrode 42 and the wire 43. Since the light-emitting body 40 is exposed, it is possible to extract the light emitted from it to the outside with ease and certainty.

In the above description of this embodiment, the wire 43 is inserted into the light-emitting body 40 from above.

However, the wire 43 may be inserted into the light-emitting body 40 also from its side to cause the light-emitting body 40 to emit light. Moreover, it is also possible to cause the light-emitting body 40 to emit light by bringing the wire 43 into contact with the surface or side of the light-emitting body 40 without inserting the wire 43 into it. Further, the second electrode, which forms a pair with the first electrode 42, is not limited to the wire 43, and an electrode in any other shape can also be used.

EXAMPLES

Example 1

The light-emitting device 1 shown in FIG. 1 was made in the following manner.

Two glass plates 3 (size: 10 mm×10 mm) serving as baseplates, each glass plate 3 having one surface on which an ITO-made electrode 4 with a thickness of 150 nm is formed, were first prepared. These glass plates 3 were washed with a detergent, cleaned ultrasonically, and dried. Then, they were cleaned with UV and were stuck together with 25-μm thick film spacers 9, 10 between them, with the surfaces on which the electrode 4 is formed facing each other, to make an empty cell 8 between the glass plates 3.

To N,N-diethyl-N-methyl-N-(2-methoxyethyl)ammonium tetrafluoroborate, ionic liquid 6, was added $Ru(bpy_3)Cl_2$, light-emitting material 7, in an amount of 2.5% by weight. The mixture was stirred at 65° C. for three hours at 500 rpm to dissolve thoroughly $Ru(bpy_3)Cl_2$, light-emitting material 7, in the ionic liquid 6 to give a luminescent solution.

The luminescent solution was injected into the empty cell 8 between the two glass plates 8 by capillary action, and then the pore 11 was sealed with an ultraviolet-curing adhesive 12 serving as a sealing material. In this manner, a light-emitting layer 5 made of the luminescent solution was formed between the glass plates 3 and the light-emitting device 1 was finally obtained.

An alternating voltage of ±6 V at 30 Hz was applied to the light-emitting layer 5. This caused the emission of red light with a luminance of 50 cd/m².

Example 2

A light-emitting device 1 was made in the same manner as in Example 1, except that glass plates 3 of 500 mm×500 mm were used as the baseplates, and that the luminescent solution was vacuum-injected into the empty cell 8 between the glass plates 3. It should be noted that the vacuum-injection of the luminescent solution into the empty cell 8 takes a shorter time than the injection of the luminescent solution by capillary action.

An alternating voltage of ±6 V at 30 Hz was applied to the light-emitting layer 5 obtained in this example. This caused the emission of red light with a luminance of 50 cd/m². Moreover, the light-emitting layer 5 did not deteriorate.

Example 3

A light-emitting device 1 was made in the same manner as in Example 2, except that 1-allyl-3-butylimidazolium bis(trifluoromethanesulfonyl)imide (ABImTFSI) was used as the ionic liquid 6.

Since ABImTFSI, ionic liquid 6, has higher polarity than N,N-diethyl-N-methyl-N-(2-methoxyethyl)ammonium tetrafluoroborate used in Example 2, it was able to dissolve $Ru(bpy_3)Cl_2$, light-emitting material 7, in an amount of 5% by weight.

An alternating voltage of ±6 V at 30 Hz was applied to the light-emitting layer 5 obtained in this example. This caused the emission of red light with a luminance of 100 cd/m².

Example 4

A light-emitting device 1 was made in the same manner as in Example 3, except that $Ru(d_8\text{-}bpy_3)PF_6$ was used as the light-emitting material 7.

An alternating voltage of ±6 V at 30 Hz was applied to the light-emitting layer 5 obtained in this example. This caused the emission of red light with a luminance of 200 cd/m².

Example 5

A light-emitting device 1 was made in the same manner as in Example 4, except that DPA (9,10-diphenylanthracene) was used as the light-emitting material 7.

An alternating voltage of ±10 V at 30 Hz was applied to the light-emitting layer 5 obtained in this example. This caused the emission of green light with a luminance of 30 cd/m².

Example 6

A light-emitting device 1 was made in the same manner as in Example 5, except that perylene was used as the light-emitting material 7.

An alternating voltage of ±10 V at 30 Hz was applied to the light-emitting layer 5 obtained in this example. This caused the emission of blue light with a luminance of 20 cd/m².

Example 7

A light-emitting device 1 was made in the same manner basically as in Example 3, except that a gelling agent (silica fine particles, Aerosil 200, manufactured by Nippon Aerosil Co., Ltd., Japan) 30 was added to the luminescent solution.

In this Example, a luminescent solution was prepared by dissolving, in ABImTFSI serving as ionic liquid 6, Ru(bpy$_3$)Cl$_2$ serving as light-emitting material 7 in an amount of 2% by weight. To this luminescent solution were added the silica fine particles, and the mixture was stirred for a predetermined time.

The characteristics of the light-emitting layer 5 formed in this Example were confirmed by applying alternating voltage to the light-emitting layer 5. Specifically, a luminescent solution containing no silica fine particles and luminescent solutions containing 3%, 4%, 7% and 10% by weight of the silica fine particles were prepared; light-emitting layers 5 were formed from these luminescent solutions; and alternating voltage was applied to each light-emitting layer. As a result, there was obtained the relationship between alternating voltage and luminance, as shown in FIG. 7, where the silica fine particles content in the luminescent solution is a parameter.

Figure 7:
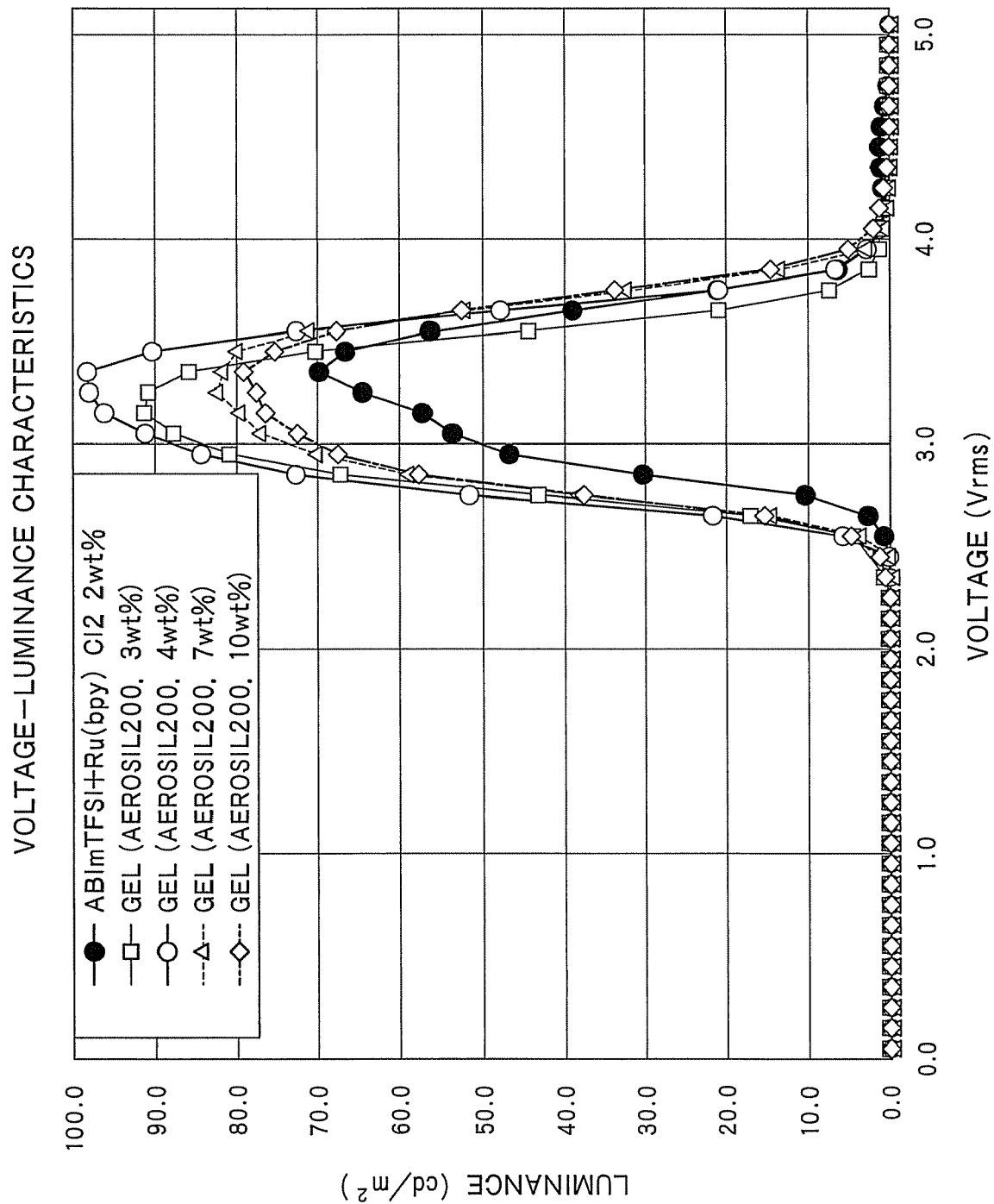
FIG. 7 is a graph showing the relationship between voltage and luminance.

As FIG. 7 shows, the luminance of each light-emitting layer 5 made from the luminescent solution containing the silica fine particles is higher than that of the light-emitting layer 5 made from the luminescent solution containing no silica fine particles. This is because the silica fine particles contained in the light-emitting layer 5 have the multiple scattering effect.

Example 8

A light-emitting device 45 was made in the same manner as in Example 7, except that alternative voltage was applied to a light-emitting body obtained by turning luminescent solution into a gel and by being formed in mass.

In this Example, a luminescent solution was first prepared by dissolving, in ABImTFSI serving as ionic liquid 6, Ru(bpy$_3$)CL$_2$ serving as light-emitting material 7 in an amount of 2% by weight. To this luminescent solution was added the silica fine particles, and the luminescent solution was turned into a gel by stirring it for a predetermined time. The gelled luminescent solution was formed in mass, thereby making a light-emitting body 40.

The light-emitting body 40 formed in mass was placed on the electrode 42-formed surface of the baseplate 41, and a wire 43 was inserted into the light-emitting body 40 from above. The diameter of the wire 43 was 1 mm, and the distance x between the tip of the wire 43 and the upper surface of the electrode 42 (see FIG. 9) was made 2 mm.

An alternating voltage of ±3 V at 60 Hz was applied to the light-emitting body 40 via the electrode 42 and the wire 43. This caused the light-emitting body 40 to emit light.

The invention claimed is:

1. A light-emitting device comprising:
a pair of baseplates respectively having surfaces facing each other, each surface having an electrode formed thereon;
a light-emitting layer sandwiched between the two baseplates;
wherein the light-emitting layer contains an ionic liquid, a light-emitting material dissolved in the ionic liquid, and a gelling agent for turning the ionic liquid into a gel.

2. The light-emitting device according to claim 1, wherein the gelling agent comprises any one of nanometer-sized fine particles of silica and nanometer-sized fine particles of titanium oxide.

3. The light-emitting device according to claim 1, wherein the light-emitting layer emits light when alternating voltage is applied to it.

4. The light-emitting device according to claim 1, wherein the ionic liquid contains a material selected from aliphatic system, imidazolium system, and pyridium system.

5. The light-emitting device according to claim 1, wherein the light-emitting material contains a material selected from ruthenium compounds or complexes, PVB (polyvinylbutyral), DPA (9,10-diphenylanthracene), and perylene.

6. A method for making a light-emitting device, comprising:
preparing a pair of baseplates respectively having surfaces, each surface having an electrode formed thereon;
placing the two baseplates so that the surfaces having the electrode formed thereon face each other;
dissolving a light-emitting material in an ionic liquid;
adding a gelling agent for turning the ionic liquid into a gel, to the ionic liquid in which the light-emitting material has been dissolved; and
pouring the ionic liquid in which the light-emitting material has been dissolved and to which the gelling agent has been added, into a space between the two baseplates, thereby forming a light-emitting layer.

7. A method for making a light-emitting device, comprising:
preparing a pair of baseplates respectively having surfaces, each surface having an electrode formed thereon;
dissolving a light-emitting material in an ionic liquid;
adding a gelling agent for turning the ionic liquid into a gel, to the ionic liquid in which the light-emitting material has been dissolved;
applying the ionic liquid in which the light-emitting material has been dissolved and to which the gelling agent has been added, to the surface of one of the two baseplates, on which the electrode is formed, thereby forming a light-emitting layer; and
placing the other baseplate on the light-emitting layer so that the surface of the other baseplate, on which the electrode is formed, faces toward the light-emitting layer.

8. A light-emitting body, comprising:
an ionic liquid; a light-emitting material dissolved in the ionic liquid; and a gelling agent for turning the ionic liquid into a gel;
wherein the light-emitting body is formed in mass.

9. A light-emitting device comprising:
a supporting substrate having a surface, said surface having a first electrode formed thereon;
a light-emitting body placed on the surface of the supporting substrate; and
a second electrode that is in contact with the light-emitting body;
wherein the light-emitting body contains an ionic liquid, a light-emitting material dissolved in the ionic liquid, and a gelling agent for turning the ionic liquid into a gel, and is formed in mass.

10. A method for making a light-emitting device, comprising:
- preparing a supporting substrate having a surface, said surface having a first electrode formed thereon;
- dissolving a light-emitting material in an ionic liquid;
- adding a gelling agent for turning the ionic liquid into a gel, to the ionic liquid in which the light-emitting material has been dissolved;
- forming the ionic liquid in which the gelling agent has been added, in mass, thereby obtaining a light-emitting body;
- placing the light-emitting body on the surface of the supporting substrate; and
- bringing a second electrode into contact with the light-emitting body.

* * * * *